United States Patent

Sakamoto

[11] Patent Number: 5,186,349
[45] Date of Patent: Feb. 16, 1993

[54] HINGE MECHANISM
[75] Inventor: Manabu Sakamoto, Kanagawa, Japan
[73] Assignee: Ikeda Bussan Co., Ltd., Ayase, Japan
[21] Appl. No.: 765,210
[22] Filed: Sep. 25, 1991
[30] Foreign Application Priority Data Sep. 26, 1990 [JP] Japan .................. 2-100614[U]

[51] Int. Cl.$^5$ ........................................... B65D 43/14
[52] U.S. Cl. ................................. 220/331; 220/343;
16/357; 16/361
[58] Field of Search ............ 220/334, 338, 343, 337,
220/331; 16/357, 360, 361

[56] References Cited

U.S. PATENT DOCUMENTS 1,195,085  8/1916  Raber ........................... 16/361 X
1,793,946  2/1931  McEwan ........................ 16/361 X
2,720,677  10/1955  Evans ............................ 16/361

FOREIGN PATENT DOCUMENTS 795864  6/1958  United Kingdom .
1476934  6/1977  United Kingdom .
2019712  11/1979  United Kingdom .

Primary Examiner—Allan N. Shoap
Assistant Examiner—Nova Stucker
Attorney, Agent, or Firm—Foley & Lardner

[57] ABSTRACT

A hinge mechanism for joining a lid of a box with a fixed member and allowing the lid to pivot relative to the fixed member includes a rod and a guiding member which guides the movement of the rod. The rod is secured to the lid. The guiding member is secured to the fixed member which is fixed relative to the box. The lid is placed on a substantially horizontal top hem portion of the box and has a lower peripheral edge portion thereof which is in contact with the top hem portion and located near the fixed member and serves as a fulcrum of the pivotal movement of the lid. The guiding member has an envelope portion thereof for defining an enclosed space for receiving the rod therein. The enclosed space is so sized as to allow the rod to slide smoothly therein.

9 Claims, 3 Drawing Sheets

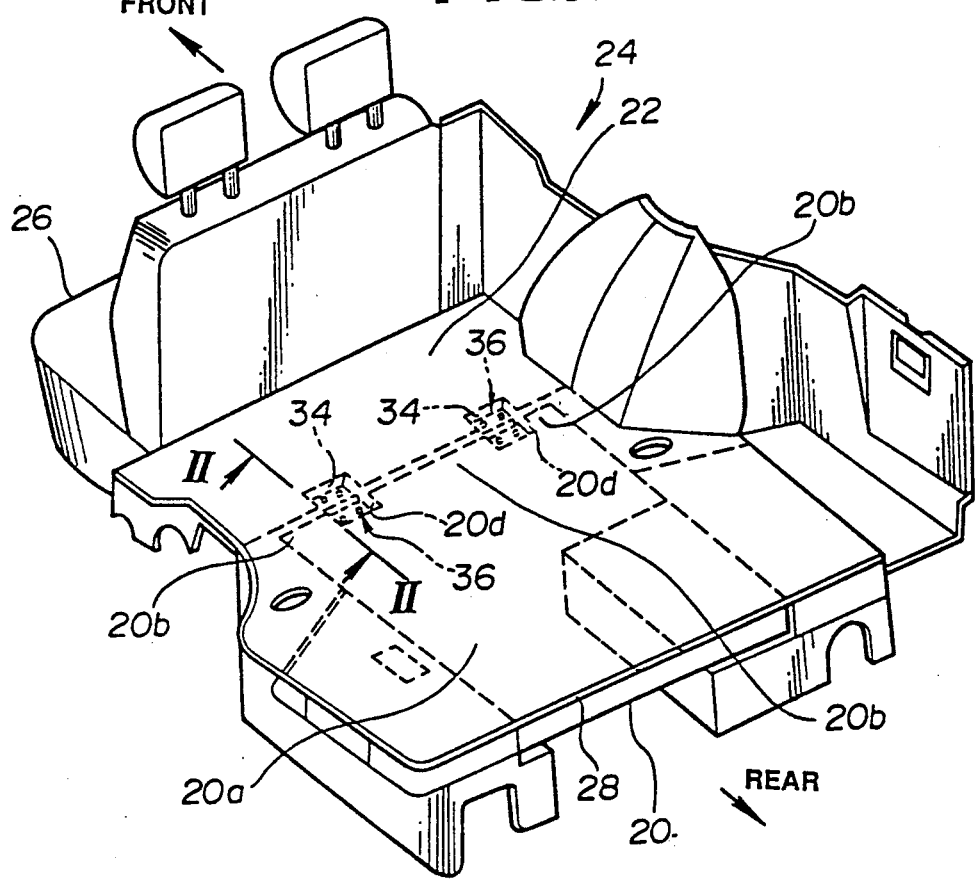
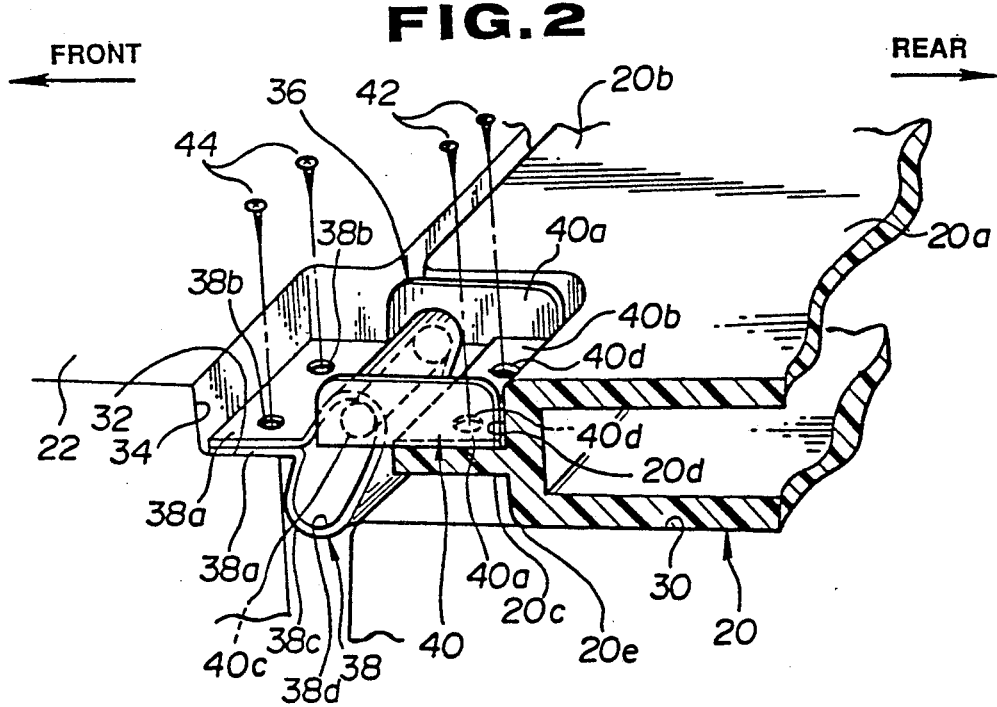

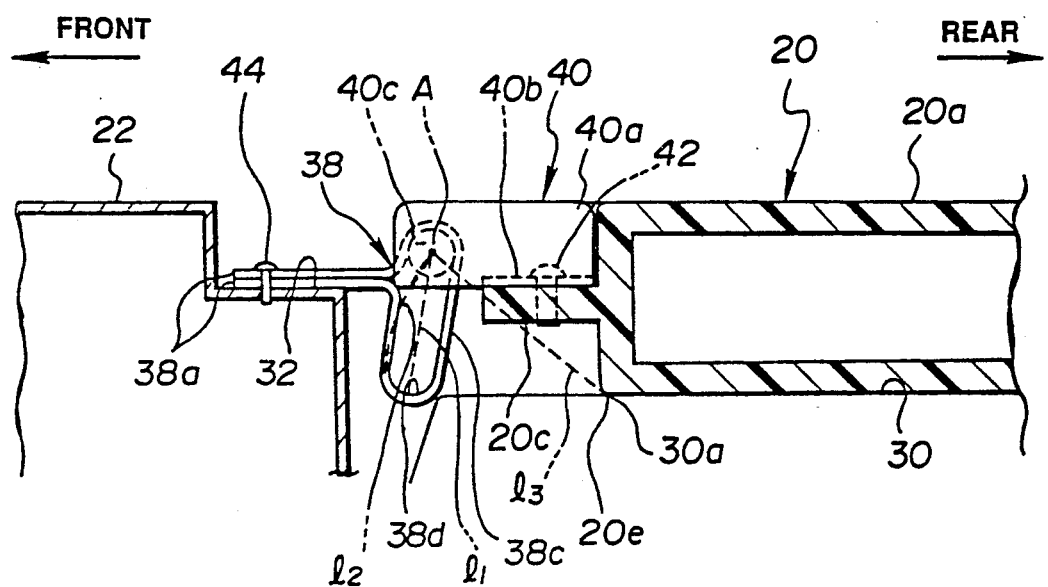
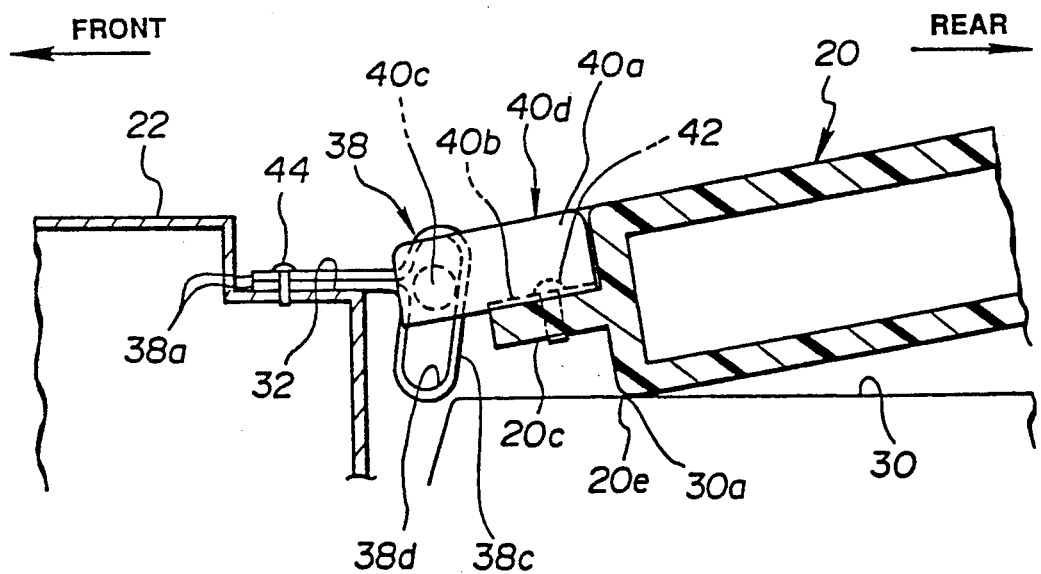

HINGE MECHANISM

BACKGROUND OF THE INVENTION

1. Field of the Invention

The present invention relates in general to a hinge mechanism, and more particularly to a hinge mechanism which joins a lid member of a vehicular luggage box with a vehicular floor panel and allows the lid member to swing relative to the floor panel.

2. Description of the Prior Art

In order to clarify the task of the present invention, one conventional hinge mechanism will be outlined with reference to FIG. 6 of the accompanying drawings.

As is seen from FIG. 6, designated by numeral 10 is a top hem portion of a luggage box, for example, of a station wagon type motor vehicle for stowing a spare tire and/or other items therein. A lid member 12 is disposed on the top of the luggage box when the lid member 12 is closed. The luggage box is located under the luggage space 18 which is disposed behind a rear seat of the station wagon type motor vehicle. The lid member 12 is connected at its front end portion 12a to a horizontal depressed portion 14a of a floor panel 14 through two conventional hinge members 16 (only one is shown). Each hinge member 16 is constructed of two metal plates 16a which are bolted to the front end portion 12a of the lid member 12 and the the depressed portion 14a of the floor panel 14 respectively and a hinge pin 16b which connects the metal plates 16a together. Therefore, the lid member 12 is swingable about the hinge pin 16b so as to open or close the same.

However, the above-mentioned conventional hinge mechanism has the following drawback.

When the lid member 12 is opened, the lid member 12 is upwardly inclined. Upon this, a heavy load of the lid member 12 concentrates on the hinge pin 16b of the hinge member 16. Therefore, the hinge member 16 tends to be broken.

SUMMARY OF THE INVENTION

It is therefore a general object of the present invention to provide a hinge mechanism which is hard to be broken as compared with the above-mentioned conventional hinge mechanism.

It is a more specific object of the present invention to provide a hinge mechanism on which a heavy load of a lid member does not concentrate.

According to a first aspect of the present invention, there is provided a hinge mechanism for joining a lid of a box with a fixed member and allowing the lid to pivot relative to the fixed member, the lid being placed on a substantially horizontal top hem portion of the box and having a lower peripheral edge portion thereof which is in contact with the top hem portion and located near the fixed member and serves as a fulcrum of the pivotal movement of the lid, the fixed member being fixed relative to the box, the hinge mechanism comprising: a rod secured to one of the lid and the fixed member; and guiding means for guiding the movement of the rod, the guiding means being secured to the other of the lid and the fixed member and constructed so as to define an enclosed space for receiving the rod therein, the enclosed space being so sized as to allow the rod to slide smoothly therein.

According to a second aspect of the present invention, there is provided a combination including first means for defining an opening; a lid which is placed substantially horizontally on the first means for closing the opening, the lid having a lower peripheral edge portion thereof which is in contact with the first means; second means for holding the lid on the first means, the second means being located near the lower peripheral edge portion of the lid; and a hinge mechanism for joining the lid with the second means and for allowing the lid to pivot relative to the second means, the hinge mechanism comprising a rod secured to one of the lid and the second means, and guiding means for guiding the movement of the rod, the guiding means being secured to the other of the lid and the second means and constructed so as to define an enclosed space for receiving the rod therein, the enclosed space being so sized as to allow the rod to slide smoothly therein, wherein, when the lid is pivoted, the lower peripheral edge portion of the lid serves as a fulcrum of the pivotal movement of the lid.

BRIEF DESCRIPTION OF THE DRAWINGS

FIG. 1 is a perspective, but partially cutaway, view of a rear body, for example, of a station wagon type motor vehicle, showing a hinge mechanism for joining a lid member with a floor panel, according to the present invention;

FIG. 2 is an enlarged perspective view of an essential part of the present invention, showing a section which is taken along the line II—II of FIG. 1;

FIG. 3 is a view similar to FIG. 2, but showing a vertically sectional view and a condition in which the lid member is fully closed;

FIG. 4 is a view similar to FIG. 3, but showing a condition in which the lid member is half opened;

DESCRIPTION OF THE PREFERRED INVENTION

Figure 5:
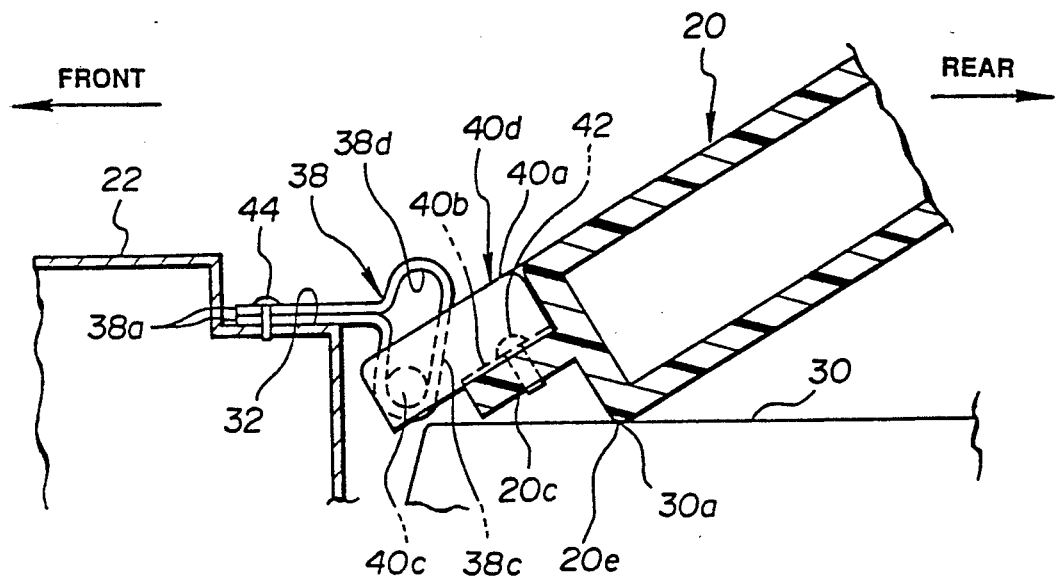
FIG. 5 is a view similar to FIG. 3, but showing a condition in which the lid member is fully opened.
Figure 6:
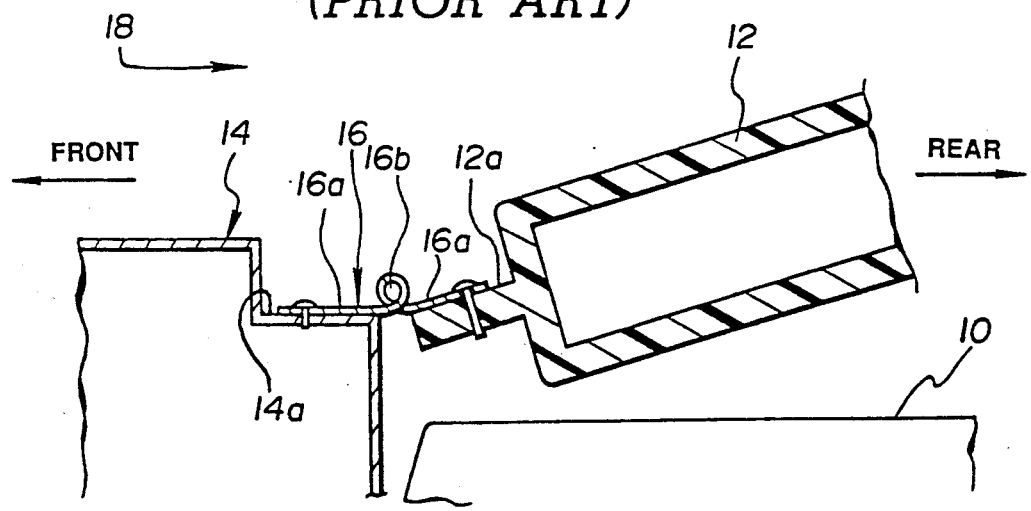
FIG. 6 is a view similar to FIG. 3, but showing a conventional hinge mechanism.

Referring to FIGS. 1 to 5, there is shown a hinge mechanism according to the present invention, which mechanism joins a lid member 20 of a vehicular luggage box (no numeral) with a vehicular floor panel 22 and allows the lid member 20 to swing relative to the floor panel 22.

As is seen from FIG. 1, designated by numeral 24 is the luggage space, for example, of a station wagon type motor vehicle for stowing bulky items therein. The luggage space 24 is disposed behind a rear seat 26. The luggage box (partially shown in FIG. 2) is located below the luggage space 24, and has the lid member 20 thereon. A spare tire and/or other items can be stowed in the luggage box.

When the lid member 20 is closed, an upper surface of the lid member 20 is kept horizontal and level with an upper surface of the floor panel 22. Thus, the floor panel 22 and the lid member 20 constitute a floor of the luggage space 24. A suitable carpet 28 is placed on the floor for covering the same.

As is seen from FIGS. 1 and 2, the lid member 20 is one-piece in construction and made of plastic or the like. When the lid member 20 is closed, the lid member 20 is placed on a horizontal hem portion 30 of the luggage box. The lid member 20 comprises a major rectangular portion 20a which is hollow in structure, a front upper rectangular portion 20b which projects forwardly from the major rectangular portion 20a and extends transversely from a left side edge to a right side edge of the major rectangular portion 20a, and two horizontal wall portions 20c (only one is shown). The front upper rectangular portion 20b has two first rectangular spaces 20d formed therein, which spaces 20d are spaced away from each other. Each first rectangular space 20d has its height and width which are the same as those of the front upper rectangular portion 20b, the width being defined in a fore-and-aft direction. Each first rectangular space 20d has its length which is much smaller than that of the front upper rectangular portion 20b, the length being defined in a transverse direction. Each horizontal wall portion 20c is located immediately under the first rectangular space 20d. The horizontal wall portion 20c has its width which is smaller than that of the first rectangular space 20d, and has its length which is the same as that of the first rectangular space 20d, the width and the length being defined in fore-and-aft and transverse directions, respectively.

The floor panel 22 is formed at its rear end with two spaced depressions which are opposed to the first rectangular spaces 20d, respectively. Each depression defines a depressed horizontal surface 32 and a second rectangular space 34 having its height which is the same as that of the first rectangular space 20d. The width of the second rectangular space 34 is the same as or slightly smaller than that of the first rectangular space 20d, the width being defined in a transverse direction.

The lid member 20 is connected at its front end portion to the floor panel 22 by means of two hinge members 36. Each hinge member 36 comprises a guide member 38 and a bracket 40. The bracket 40 includes two spaced vertical wall portions 40a, a horizontal wall portion 40b which unites the vertical wall portions 40a together, and a circular rod 40c which also unites the vertical wall portions 40a together and extends transversely. Each vertical wall portion 40a has its height and length which are the same as those of the first rectangular space 20d of the lid member 20, the length being defined in a fore-and-aft direction. The horizontal wall portion 40b of the bracket 40 is so sized as to be mated with the horizontal wall portion 20c of the lid member 20. The circular rod 40c is positioned ahead of the horizontal wall portion 20c and below the top of the vertical wall portions 40a. The horizontal wall portion 40b has two holes 40d through which two screws 42 are fixed to the horizontal wall portion 20c of the lid member 20. Thus, the bracket 40 is snugly received in the first rectangular space 20d of the lid member 20 and fixed to the horizontal wall portion 20c of the lid member 20.

The guide member 38 is made of a sheet of metal or the like. The guide member 38 comprises upper and lower horizontal flange portions 38a which have two spaced holes 38b formed therethrough respectively and an envelope portion 38c defining a space 38d inside the same. The guide member 38 is fixed at its horizontal flange portions 38a on the depressed horizontal surface 32 through two screws 44. The guide member 38 is so sized as to be fitted in a space defined between the vertical wall portions 40a of the bracket 40. Therefore, there is no play between the lid member 20 and the floor panel 22 in a transverse direction. The upper end of the envelope portion 38c is positioned below the upper surfaces of the lid member 20 and the floor panel 22. The rod 40c of the bracket 40 is received in the space 38d of the guide member 38. The space 38d is so sized as to receive the rod 40c therein without having play in a fore-and-aft direction and as to allow the rod 40c to move straight from an upper end of the space 38d to a lower end of the space 38d.

Operation will be described in the following.

As is seen from FIG. 3, when the lid member 20 is closed, the lid member 20 is horizontally placed on the hem portion 30 of the luggage box. Upon this, the rod 40c of the bracket is in abutment with an upper end portion of the envelope portion 38c of the guide member 38.

As is seen from FIG. 4, when the lid member 20 is upwardly rotated so as to open the same, the rod 40c of the bracket 40 moves downwardly in the space 38d of the envelope portion 38c. That is, an axis "A" of the rod 40c moves downwardly along an imaginary straight line $l_1$ which is a center line of the space 38d (see FIG. 3). The imaginary straight line $l_1$ is positioned to rearward of an imaginary arc $l_2$ of a circle of which center is a lower front edge 20e of the lid member 20 and of which radius is the length of a straight line $l_3$ going from the center 20e to the axis "A" of the rod 40c which is in abutment with the upper end portion of the envelope 38d. Therefore, when the lid member 20 is upwardly moved, the lower front edge 20e of the lid member 20 is slid slightly rearwardly on the hem portion 30 of the luggage box. On the other hand, if the envelope portion 38c were so shaped as that the center line $l_1$ thereof conforms to the imaginary arc $l_2$, the lower front edge 20e of the lid member 20 would be fixed on a given position of the hem portion 30 of the luggage box during the pivotal movement of the lid member 20. The lower front edge 20e of the lid member 20 serves a fulcrum about which the lid member 20 is rotated.

As is seen from FIG. 5, when the lid member 20 is fully opened, the rod 40c is in abutment with a lower end portion of the envelope portion 38c of the guide member 38. Upon this, a heavy load of the lid member 20 is not concentrated on the hinge members 36, but on a portion 30a of the hem portion 30 of the luggage box, which portion 30a is located under the lower front edge 20e of the lid member 20. Therefore, the durability of the hinge mechanism is improved as compared with the above-mentioned conventional hinge mechanism.

In the above-mentioned embodiment of the present invention, the bracket and the guide member are secured to the lid member and the floor panel, respectively. However, if desired, the bracket and the guide member may be secured to the floor panel and the lid member, respectively.

What is claimed is:

1. In combination,
   a box having a lid;
   a fixed member; and
   a hinge mechanism for joining said lid of said box with said fixed member and allowing said lid to pivot relative to said fixed member, said lid being placed on a substantially horizontal top hem portion of said box and having a lower peripheral edge portion thereof which is in contact with said top hem portion and located near said fixed member and serves as a fulcrum of the pivotal movement of said lid, said fixed member being fixed relative to said box, said hinge mechanism comprising:
   a rod secured to one of said lid and said fixed member;
   securing means for securing said rod to said one of said lid and said fixed member, said securing means comprising two vertical wall portions which are secured to longitudinally opposed ends of said rod respectively and a horizontal wall portion which unites said vertical wall portions and is fixed to said one of said lid and said fixed member; and guiding means for guiding the movement of said rod, said guiding means being secured to the other of said lid and said fixed member and comprising a horizontal flange portion which is secured to said fixed member and an envelop portion which defines an enclosed space inside the same for receiving said rod therein, said envelope portion being so sized as to allow said rod to slide smoothly therein and as to be interposed between said vertical wall portions of said securing means with having no play therebetween.

2. A hinge mechanism as claimed in claim 1, in which said enclosed space has first and second ends thereof.

3. A hinge mechanism as claimed in claim 2, in which, when said lid is fully closed, said lid is substantially horizontally placed on said top hem portion of said box and said rod is in abutment with said first end of said enclosed space, and in which, when said lid is fully opened, said lid is inclined and placed at said lower peripheral edge portion thereof on said top hem portion and said rod is in abutment with said second end of said enclosed space.

4. A hinge mechanism as claimed in claim 1, in which said rod is secured to said lid, and in which said guiding means is secured to said fixed member.

5. A hinge mechanism as claimed in claim 1, in which said guiding means is made of a sheet of metal which is one-piece in construction.

6. A hinge mechanism as claimed in claim 1, in which said rod is cylindrical in shape, and in which said first and second ends of said enclosed space are so curved as to conform to the shape of said rod.

7. A hinge mechanism as claimed in claim 6, in which said rod has an axis thereof which is substantially parallel to said lower peripheral edge of said lid.

8. A hinge mechanism as claimed in claim 2, in which said first and second ends of said enclosed space are upper and lower ends of said enclosed space, respectively.

9. In combination, first means for defining an opening;

a lid which is placed substantially horizontally on said first means for closing said opening, said lid having a lower peripheral edge portion thereof which is in contact with said first means;

second means for holding said lid on said first means, said second means being located near said lower peripheral edge portion of said lid; and a hinge mechanism for joining said lid with said second means and for allowing said lid to pivot relative to said second means, said hinge mechanism comprising:

a rod secured to one of said lid and said second means securing means for securing said rod to said one of said lid and said fixed member, said securing means comprising two vertical wall portions which are secured to longitudinally opposed ends of said rod respectively and a horizontal wall portion which unites said vertical wall portions and is fixed to said one of said lid and said fixed member; and guiding means for guiding the movement of said rod, said guiding means being secured to the other of said lid and said fixed member and comprising a horizontal flange portion which is secured to said fixed member and an envelope portion which defines an enclosed space inside the same for receiving said rod therein, said envelope portion being so sized as to allow said rod to slide smoothly therein and as to be interposed between said vertical wall portions of said securing means with having no play therebetween, wherein, when said lid is pivoted, said lower peripheral edge portion of said lid serves as a fulcrum of the pivotal movement of said lid.

* * * * *